United States Patent [19]

Belder et al.

[11] Patent Number: 4,463,140

[45] Date of Patent: Jul. 31, 1984

[54] POWDER COATING

[75] Inventors: Eimbert G. Belder; Robert van der Linde; Jan Schippers, all of Zwolle, Netherlands

[73] Assignee: DSM Resins B.V., Zwolle, Netherlands

[21] Appl. No.: 478,545

[22] Filed: Mar. 24, 1983

[30] Foreign Application Priority Data

Oct. 29, 1982 [NL] Netherlands ............... 8204206

[51] Int. Cl.³ .................................. C08G 63/76
[52] U.S. Cl. ........................ 525/438; 525/440; 525/444; 525/448; 528/272; 528/297; 528/302
[58] Field of Search ............ 525/438, 444, 448, 440; 528/272, 297, 302

[56] References Cited

U.S. PATENT DOCUMENTS

| 3,621,074 | 11/1968 | Siggel et al. | 525/438 X |
| 3,970,621 | 7/1976 | Kondo et al. | 525/438 X |
| 4,085,159 | 4/1978 | Marsiat | 525/438 X |
| 4,147,737 | 4/1979 | Sein et al. | 525/438 |
| 4,288,569 | 9/1981 | Rottmaier et al. | 525/438 X |

FOREIGN PATENT DOCUMENTS 1384038 2/1975 United Kingdom .

Primary Examiner—Lucille M. Phynes
Attorney, Agent, or Firm—Cushman, Darby & Cushman

[57] ABSTRACT

Powder coatings and a powder composition having a valuable combination of characteristics are described, composed of a homogeneous mixture of between 1.9 and 9.0 wt. % of a diglycidyl phthalate and between 91.0 and 98.1 wt. % of a polyester, wherein said polyester has (a) an acid number between 10 and 30 mg KOH/g, (b) a hydroxyl number less than 15 mg KOH/g, (c) a theoretical number-average molecular weight between 3,750 and 12,500 and (d) a glass transition temperature between 48° and 85° C.

18 Claims, No Drawings

POWDER COATING

This invention relates to a novel powder coating of wherein binding agent consists of a homogeneous mixture that comprises a diglycidyl phthalate and a polyester containing carboxyl groups.

Powder coatings of this kind are already known, inter alia, from British published Patent Application No. 1384038, in which a binding agent is described that consists, e.g., of 13 wt.% of the diglycidyl ester of hexahydrophthalic acid and 87 wt.% of polyester. In practice, however, these coatings present one or several of the following problems:
1. The high content of diglycidyl phthalate requires a relatively high glass transition temperature, as a result of which limitations in the freedom of formulation of the polyester occur.
2. The flow of the polyester-epoxy combination is not optimal ("orange-peel effect").
3. The physical and also the chemical powder stability is not all that is to be desired, particularly with polyesters having a glass transition temperature below 55° C.
4. The cured coating layer does not have good heat resistance.

It is an object of this invention to provide an improved powder coating composition which has advantageous characteristics in overcoming the aforesaid problems.

The present invention now provides powder coatings which have a valuable combination of characteristics, namely (a) an acid number between 10 and 30 mg KOH/g, (b) a hydroxyl number of a maximum of 15 mg KOH/g, (c) a theoretical number-average molecular weight (according to Patton) between 3,750 and 12,500 and (d) a glass transition temperature (Tg) between 48° and 85° C.

The weight percentage of diglycidyl phthalate used according to this invention is between 1.9 and 9.0%. By "a diglycidyl phthalate" there is meant here a diglycidyl ester of a phthalic acid (e.g. phthalic acid, isophthalic acid, terephthalic acid and the hydro derivatives thereof).

Still further improved results are realized when (a) the acid number of the polyester (resin) is between 15 and 28 mg KOH/g, (b) the hydroxyl number is below 5 mg KOH/g, (c) the theoretical number-average molecular weight between 4,500 and 10,000 and (d) the Tg is between 50° and 70° C.

The average carboxyl functionality of the polyester is situated in the range of 2 to 3, advantageously between 2.2 and 2.8 and more particularly between 2.2 and 2.5.

Especially conspicuous is the relatively high molecular weight and it is quite surprising that in spite of this high molecular weight a better flow for the powder coating is obtained. Moreover, because of its high molecular weight, the polyester resin contains relatively little low molecular material, as a result of which the powder stability improves. Noteworthy also is the improved thermic stability. This greater thermic stability, possessed by the polyesterepoxy binding agent used according to this invention, makes these systems particularly suitable as coating layers for radiators, lighting fixtures and other objects which are usually exposed to a prolonged heat load.

The polyesters containing carboxyl groups, which are used according to the invention, may be prepared, by methods which are already known per se, e.g., from substantially aromatic polycarboxylic acids, which as phthalic acid, isophthalic acid, terephthalic acid, benzene-1,2,4-carboxylic acid, pyromellitic acid, trimesic acid, 3,6-dichlorophthalic acid, tetrachlorophthalic acid, as well as, insofar as they are obtainable, from the corresponding anhydrides, acid chlorides or lower alkyl esters thereof. Principally the carboxylic acid component consists of at least 50%, preferably at least 70 mol.% of aromatic dicarboxylic acids, particularly isophthalic acid and/or terephthalic acid.

Further, lower aliphatic diols may especially be used for the polyester formation, such as ethylene glycol, propane-1,2-diol, propane-1,3-diol, butane-1,2-diol, butane-1,4-diol, butane-1,3-diol, 2,2-dimethylpropanediol-1,3 (i.e., neopentyl glycol), hexane-2,5-diol, hexane-1,6-diol, 2,2-[bis-(4-hydroxycyclohexyl)]-propane, 1,4-dimethylolcyclohexane, diethylene glycol, dipropylene glycol and 2,2-bis-[4-(2-hydroxylethoxy)]-phenylpropane and smaller amounts of polyols, such as glycerol, hexanetriol, pentaerythritol, sorbitol, trimethylolethane, trimethylolpropane and tris-(2-hydroxyethyl)-isocyanurate. Instead of diols and polyols, epoxy compounds may also be used.

Preferably the alcohol component contains at least 50 mol.% neopentyl glycol and/or propylene glycol.

In addition, cycloaliphatic and/or acyclic polycarboxylic acids may be used as the polycarboxylic acids, such as, for example, tetrahydrophthalic acid, hexahydroendomethylenetetrahydrophthalic acid, azelaic acid, sebacic acid, decanedicarboxylic acid, dimeric fatty acid, adipic acid, succinic acid and maleic acid. Such acids are used in amounts up to at most 30 mol.%, preferably to a maximum of 20 mol.% of the total amount of carboxylic acids. Similarly, hydroxycarboxylic acids and/or alternatively lactones may be used, e.g., 12-hydroxystearic acid, epsiloncaprolactone, hydroxypivalic acid ester of neopentyl glycol (esterdiol 204). Monocarboxylic acids, such as benzoic acid, tert.-butylbenzoic acid, hexahydrobenzoic acid and saturated aliphatic monocarboxylic acids may also be added in minor amounts during the preparation.

The polyesters are prepared by methods already known per se, e.g., by esterification or interesterification, possibly in the presence of usual catalysts such as e.g., dibutyl-tin oxide or tetrabutyl titanate, whereby, through a suitable choice of the reaction conditions of the COOH/OH ratio, end products are obtained for which the acid number lies between 10 and 30, preferably between 12 and 28.

After synthesis, the polyesters are preferably practically free from hydroxyl groups, i.e., the hydroxyl number is less than 15, preferably less than 5 mg KOH/g. For optimal adjustment of the glass transition temperature, and the fiscosity, it is also advantageous to use up to 15 mol.% of a compound having 4 or more methylene groups optionally substituted with lower alkyl groups (methyl or ethyl). For example, adipic acid, hexanediol-1,6 or dipropylene glycol may be used as such.

As cross-linking agent a diglycidyl phthalate is employed. As such, preferably diglycidyl terephthalate or its hexahydro derivative are suitable. As a rule, these compounds have an epoxy-oxygen content of between 6.7 and 9.3 equivalent per kg.

The amount diglycidyl phthalate employed in the powder coating depends on the acid number of the polyester with which it is combined, and lies between 0.8 and 1.2, preferably between 0.9 and 1.1 equivalent epoxy per equivalent carboxyl.

In the case of diglycidyl terephthalate this means that between 1.9 and 9.0, preferably between 3.2 and 7.1 wt.% thereof, and consequently 91.0 to 98.1, preferably 92.9 to 96.8 wt.% of the polyester containing carboxyl groups are used.

It is quite surprising that, with the use of these small amounts of diglycidyl terephthalate, nevertheless well-cured coating layers can be obtained.

To make the composition, the polyester and the diglycidyl phthalate are homogeneously mixed, and preferably in the melt, by means of an extruder mechanism. As a rule, the usual, conventional additives are first mixed therein. This especially applies to flowing aids, curing catalysts and optionally pigments and/or fillers. Thereafter the now-solid extrudate is ground and sieved, whereafter the fraction with a particle size below 90 micrometer is applied with the aid of an electrostatic spraying apparatus onto a substrate and cured in a stoving oven at a temperature between 160° and 220° C. for 10 to 30 minutes.

The coating layer of the completely or partly coated substrate thus obtained exhibits an excellent combination of gloss, flow and mechanical properties as well as an exceptionally good heat stability, as will also be seen from the following non-limiting examples.

EXAMPLE 1A

A. Preparation of the polyester resin

A three liter reaction vessel, equipped with a thermometer, a stirrer and a distillation apparatus, was filled with the following materials; 29 g trimethylolpropane, 1,443 g terephthalic acid, 1066 g neopentyl glycol and 68 g cyclohexanedimethylol. Thereafter, with stirring, while a light stream of nitrogen was led over the reaction mixture, the temperature was increased to 220° C., at which water formed. The temperature was gradually increased further to a maximum of 250° C. and the water was distilled off. After 302 ml water had been collected, the acid number of the ester was 11.7 mg KOH/g.

Subsequently, 430 g isophthalic acid was added and further esterified to acid number 26.0 mg KOH/g. The last part of this process was carried out under reduced pressure.

The theoretical number-average molecular weight (Mn) of the acidic polyester was 5,000 (as was calculated from the end groups and the final composition of the polyester), the glass transition temperature was 62.5° C., the hydroxyl number was smaller than 5 mg KOH/g and the viscosity was 700 dPa.s at 165° C. (viscosity determined in an Emila rotation viscosimeter).

EXAMPLES 2A–7A

Following the procedure of Example 1A, polyester resins were prepared, of which the charge composition and characteristic properties are given in following Table 1.

EXAMPLE 1B

B. Preparation of the powder coating 558 g of the granulated polyester resin of Example 1A was dry-mixed with 42 g diglycidyl terephthalate, 300 g titanium dioxide pigment (from Kronos TM, Type C1 310), 9 g Resiflow TM PV-5 (a polyacrylate flowing aid 66% active, remainder probably silica, from Worlee TM) and 4.5 benzoin, and subsequently introduced into an extruder (Buss TM made, Type PR 46). The extrudate was cooled, ground and sieved, the sieve fraction, smaller than 90 micrometer, being collected and used as powder coating. This powder coating was electrostatically sprayed onto steel panels which had been degreased beforehand with trichloroethane. For this, a Gema TM made, Type HP 720, electrostatic spraying apparatus was employed. The panels sprayed with powder coating were placed in an oven and cured at 200° C. for 20 minutes. Thereafter the following properties were judged:

Gloss (Gardner 60°): 92

Mechanical properties:
 (Reverse Impact): greater than 11 kg/cm² (i.e. greater than 160 psi)
Heat resistance: good
Flow: excellent (10).

EXAMPLES 2B–7B

In the same manner as in Example 1B, powder coatings were prepared starting from the polyester resins according to Examples 2A–7A. The compositions and the test results of these powder coatings are given in following Table 2.

TABLE 1

Composition and properties of the exemplified polyesters

| Composition (g.) | 2A | 3A | 4A | 5A | 6A | 7A |
|---|---|---|---|---|---|---|
| trimethylolpropane | 32 | 32 | | 13 | 8 | 22 |
| pentaerythritol | | | 10 | | | |
| terephthalic acid | 1371 | 1363 | 1674 | 1682 | 1694 | 653 |
| neopentyl glycol | 1136 | 1100 | 920 | 1054 | 1047 | 1109 |
| ethylene glycol | | | 72 | | | |
| 1,4-cyclohexanedimethylol | | 42 | 167 | 137 | 157 | |
| hexanediol-1,6 | | | | | | 68 |
| isophthalic acid | 522 | 522 | 216 | 174 | 155 | 123 |
| adipic acid | | | | | | 84 |
| Properties | | | | | | |
| acid no. (mg KOH/g) | 29.5 | 28.8 | 28.0 | 22.5 | 20.0 | 16.1 |
| Mn | 4500 | 4500 | 4500 | 5500 | 6000 | 9000 |
| glass transition temperature (°C.) | 60.5 | 60.0 | 63.0 | 65.0 | 64.0 | 53.0 |
| hydroxyl no. (mg KOH/g) | below 5 | below 5 | below 5 | below 5 | below 5 | below 5 |
| viscosity at 165° C. (dPa.s) | 650 | 720 | 920 | 1050 | 950 | 850 |

TABLE 2

Composition and properties of the exemplified powder coatings

| Composition (g.) | 2B | 3B | 4B | 5B | 6B | 7B |
|---|---|---|---|---|---|---|
| polyester resin | 558 | 558 | 558 | 565 | 570 | 576 |
| diglycidyl terephthalate | 42 | 42 | 42 | 35[1] | 30 | 24 |
| pigment, $TiO_2$ | 300 | 300 | 300 | 300 | 300 | 300 |
| Resiflow PV-5 | 9 | 9 | 9 | 9 | 9 | 9 |
| benzoin | 4.5 | 4.5 | 4.5 | 4.5 | 4.5 | 4.5 |
| Properties | | | | | | |
| gloss (Gardner 60°) | 90 | 92 | 91 | 90 | 88 | 93 |
| mech. properties*: | | | | | | |
| (kg/cm$^2$) | 8 | >11 | >11 | >11 | >11 | >11 |
| (psi) | 120 | >160 | >160 | >160 | >160 | >160 |
| flow** | 10 | 9 | 9 | 10 | 10 | 10 |
| heat resistance*** | + | + | + | + | + | + |

[1] diglycidyl hexahydroterephthalate
*Determined according at ASTM D 2794-69
**Judged visually on a scale of 1-10, in which 1 = very bad and 10 = excellent
***17 hours at 200° C.: strong discoloration: —; slight discoloration: —; no discoloration: +

We claim:

1. A powder coating composition having a binding agent composed of a homogeneous mixture of between 1.9 and 9.0 wt.% of a diglycidyl phthalate and between 91.0 and 98.1 wt.% of a polyester, wherein said polyester has (a) an acid number between 10 and 30 mg KOH/g, (b) a hydroxyl number less than 15 mg KOH/g, (c) a theoretical number-average molecular weight between 3,750 and 12,500 and (d) a glass transition temperature between 48° and 85° C.

2. A powder coating according to claim 1, containing diglycidyl terephthalate.

3. A powder coating according to claim 1 containing diglycidyl hexahydroterephthalate.

4. A powder coating according to claim 1 wherein the weight percentage of diglycidyl phthalate is between 3.2 and 7.1 and the weight percentage of polyester is between 96.8 and 92.9.

5. A powder coating according to claim 1 wherein said acid number of said polyester is between 15 and 28 mg KOH/g.

6. A powder coating according to claim 1, wherein said hydroxyl number of said polyester is less than 5 mg KOH/g.

7. A powder coating according to claim 1 wherein said polyester has a theoretical number-average molecular weight between 4,500 and 10,000.

8. A powder coating according to claim 1 wherein said diglycidyl terephthalate has an epoxy content between 6.7 and 9.3 equivalent per kg.

9. A powder coating according to claim 1 wherein said polyester has a dicarboxylic acid mixture at least 50 mol % of isophthalic acid and/or terephthalic acid.

10. A powder coating according to claim 1 wherein said polyester has a dicarboxylic acid mixture at least 70 mol % of isophthalic acid and/or terephthalic acid.

11. A powder coating according to claim 1 wherein said polyester having an aliphatic diol mixture of at least 50 mol.% of neopentyl glycol and/or propylene glycol.

12. A powder coating according to claim 1 wherein said polyester contains a compound having at least 4 methylene groups in an amount of at most 15 mol.% of the polyester composition.

13. A powder coating composition according to claim 1 wherein the weight percentage of diglycidyl phthalate is between 3.2 and 7.1 and the weight percentage of polyester is between 96.8 and 92.9, said acid number of said polyester is between 15 and 28 mg KOH/g, said hydroxyl number of said polyester is less than 5 mg KOH/g, and said polyester has a theoretical number-average molecular weight between 4,500 and 10,000.

14. A powder coating according to claim 13 wherein said diglycidyl terephthalate has an epoxy content between 6.7 and 9.3 equivalent per kg.

15. A powder coating according to claim 13 wherein said polyester has a dicarboxylic acid mixture at least 50 mol % of isophthalic acid and/or terephthalic acid.

16. A powder coating according to claim 13 wherein said polyester has a dicarboxylic acid mixture at least 70 mol % of isophthalic acid and/or terephthalic acid.

17. A powder coating according to claim 13 wherein said polyester having an aliphatic diol mixture of at least 50 mol.% of neopentyl glycol and/or propylene glycol.

18. A powder coating according to claim 13 wherein said polyester contains a compound having at least 4 methylene groups in an amount of at most 15 mol.% of the polyester composition.

* * * * *